May 24, 1949.    P. W. NOSKER    2,470,787
SYSTEM FOR DETERMINING THE POSITION
OR PATH OF OBJECTS IN SPACE
Filed May 4, 1944    4 Sheets-Sheet 1
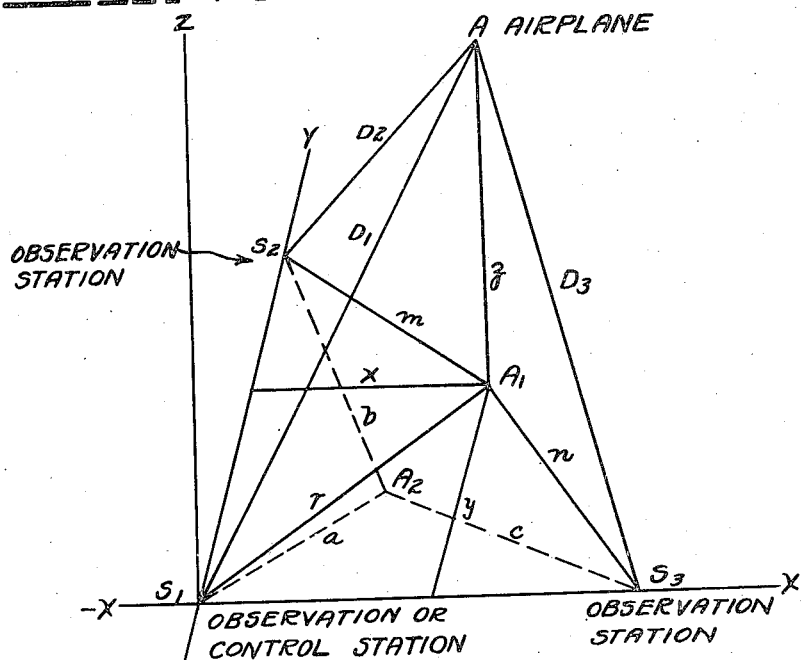
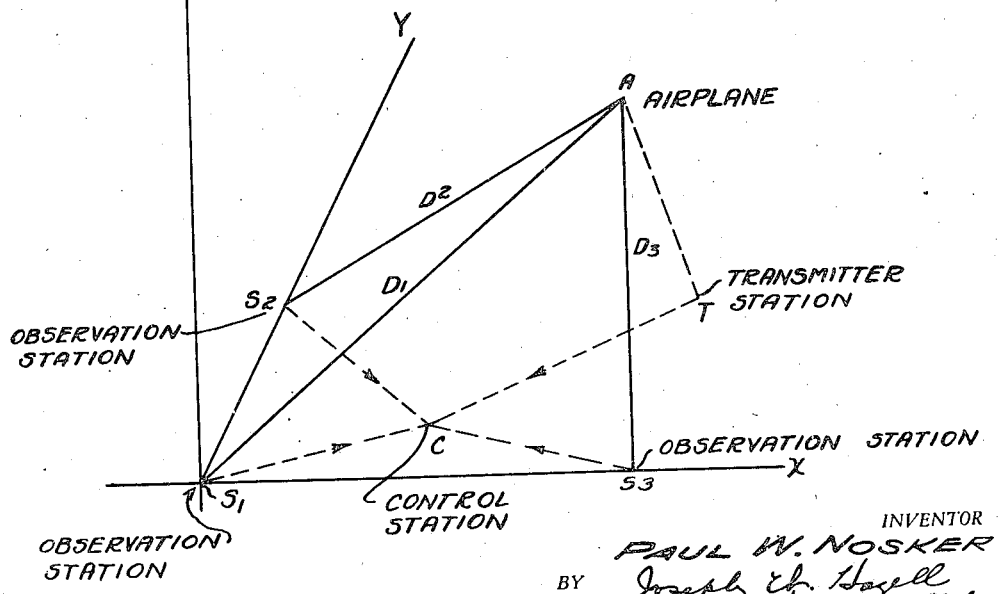
INVENTOR
PAUL W. NOSKER
BY
ATTORNEYS

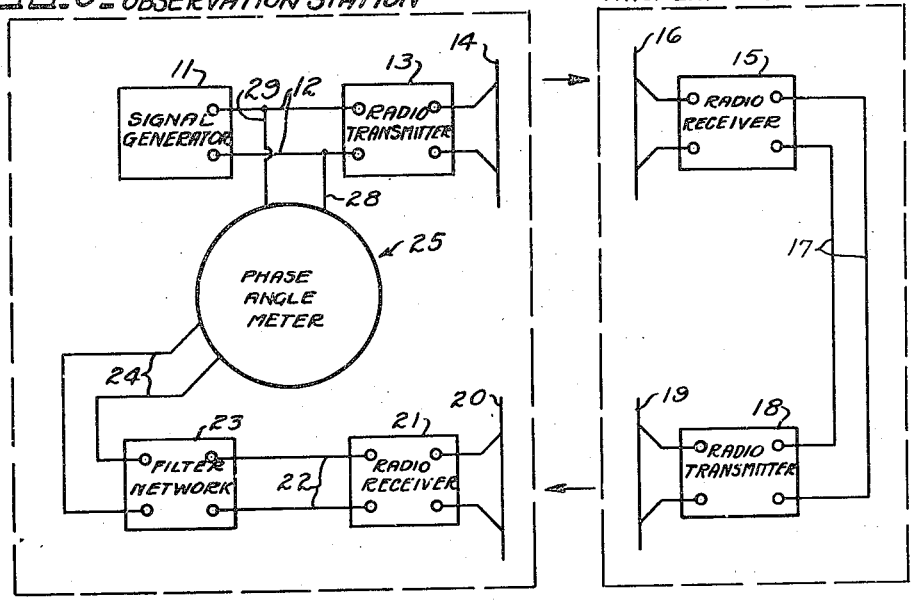
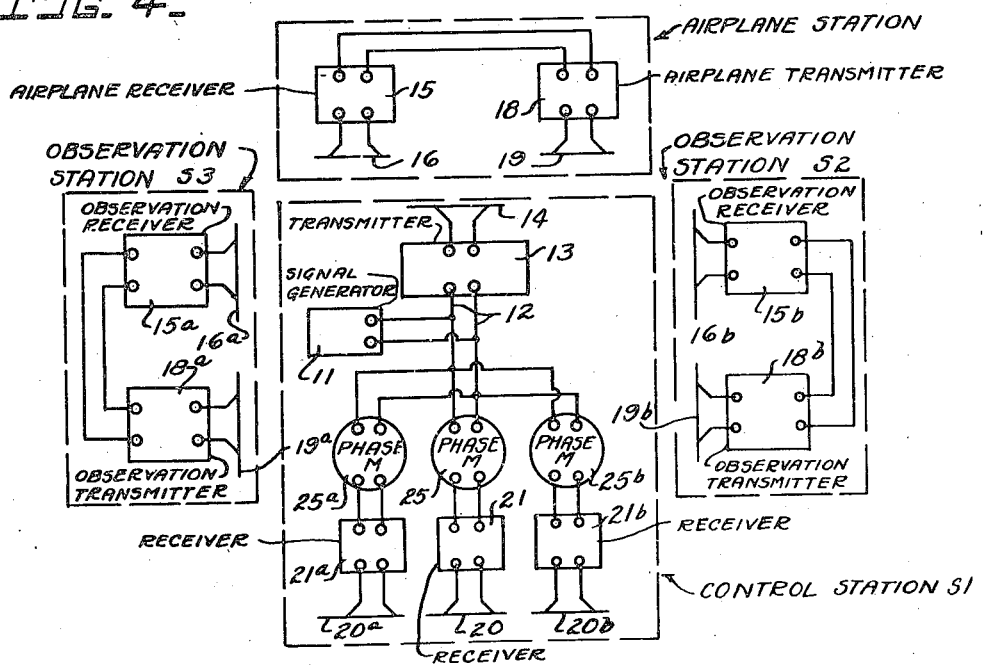

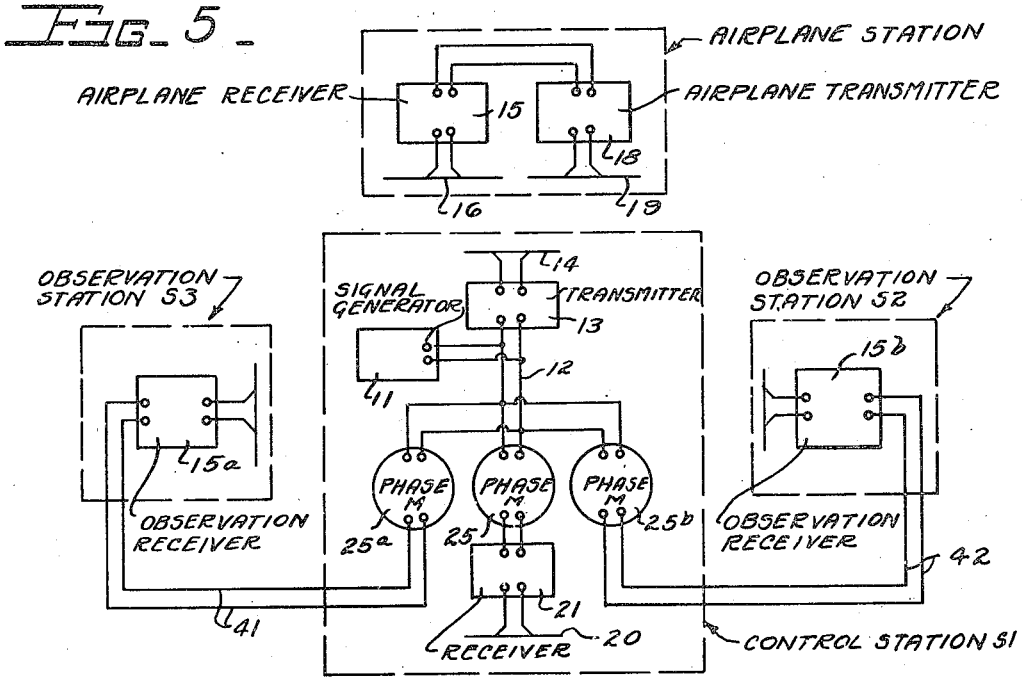
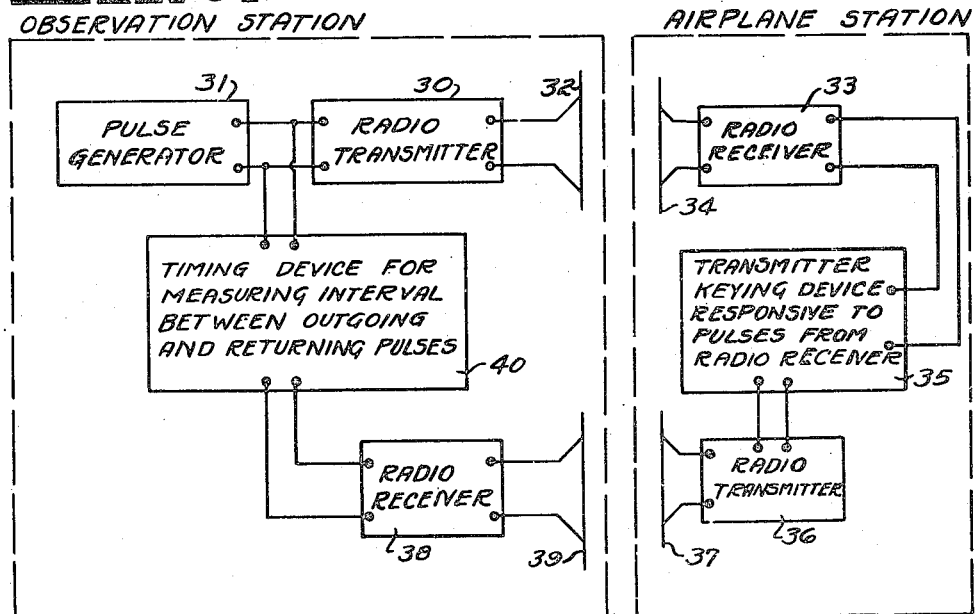

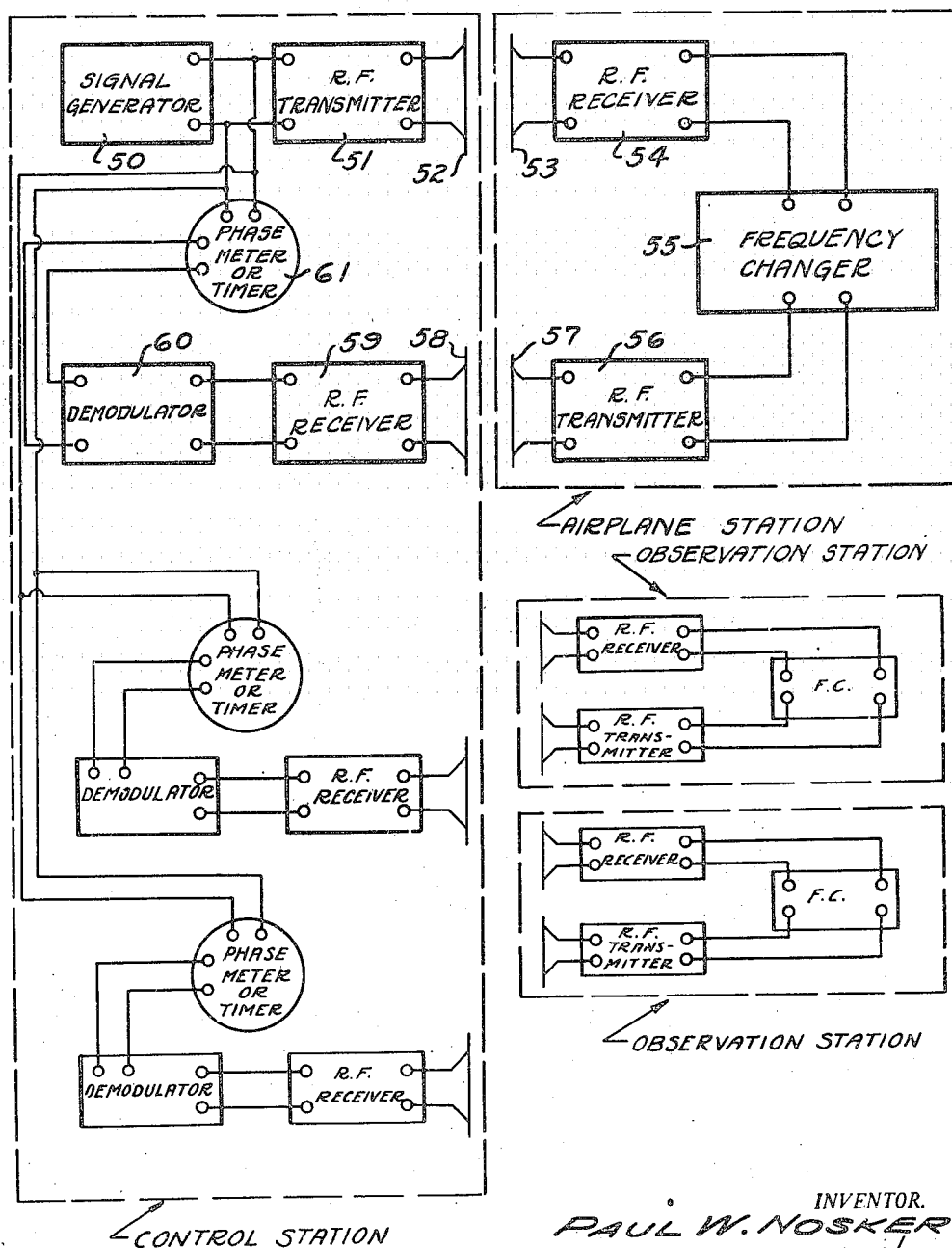

Patented May 24, 1949

2,470,787

UNITED STATES PATENT OFFICE 2,470,787

SYSTEM FOR DETERMINING THE POSITION OR PATH OF AN OBJECT IN SPACE

Paul W. Nosker, Yellow Springs, Ohio

Application May 4, 1944, Serial No. 534,126
2 Claims. (Cl. 342—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method of and apparatus for determining the position or path of an object in space, e. g., an airplane in flight.

An object of the invention is to provide a method of directly and rapidly measuring the distance between two points, one of which may be moving, without employing conventional measuring instruments. A particular object is to provide a method which facilitates the determination of the altitude, true speed, ground speed, rate of climb, resultant acceleration, tangential acceleration and radial acceleration of an airplane in flight. The invention could also be employed with rocket bombs, target airplanes, model airplanes, weather observation balloons, radio-controlled aerial torpedoes, and other objects whether traveling through the air or fixed. Further objects and advantages will be apparent from the following description of five arrangements of apparatus for practicing the method.

The Paul J. Holmes Patent No. 2,198,113, dated April 23, 1940, discloses a navigation method which is somewhat like the one I propose, but there are many differences, the most important and fundamental difference being that the patentee determines not the position in three-dimensional space but only the two-dimensional position relative to the ground, or in the phrasing of the patent, "by horizontal azimuth and distance from a known point." The reason for this is that the patentee desired to make it possible to follow on a special radio range map the course of the airplane relative to stations on the ground. Patents No. 2,134,716, dated November 1, 1938, and No. 1,750,668, dated March 18, 1930, are other examples from the prior art, each having a remote bearing on the invention herein described.

In the accompanying drawings showing schematically several practicable arrangements of apparatus for practicing the invention, Fig. 1 is a diagram of a plurality of observation stations and an airplane whose position or course is to be determined, with lines for the X, Y, and Z axes, and other lines to aid in deriving certain mathematical equations, as hereinafter explained;

Fig. 2 is a diagram like Fig. 1 but omitting the lines for said equations, and showing a different arrangement of stations;

Fig. 3 is a diagram of one form of radio wave equipment used in practicing the invention;

Fig. 4 is a diagram showing the preferred arrangement of equipment;

Fig. 5 is a diagram like Fig. 4 but somewhat simplified by the employment of land lines;

Fig. 6 is another diagram of still another arrangement of apparatus; and Fig. 7 is still another diagram of apparatus for practicing the invention.

Referring particularly to the drawings, and first to Fig. 1, the position and path of airplane A in flight is to be determined from measurements taken at three stations $S1$, $S2$, and $S3$, which for convenience are assumed as located on the earth's surface, at known distances from each other but not in the same straight line. The straight line joining $S1$ with A, is designated $D1$; the straight line joining $S2$ with A is designated $D2$; and the line joining $S3$ with A is $D3$. These three distances $D1$, $D2$, and $D3$ normally are each changing constantly while the airplane A is in flight. Ordinarily the airplane will not be observable from all three stations, and it may not be observable from any; yet its instantaneous position may be determined at any time by radio wave measurements taken at the three stations, and from a plurality of readings of positions taken at successive intervals of time, its flight path may be traced and its kinematics determined.

Now referring to Fig. 3, one of the observation stations, for example, $S1$, is shown as comprising a constant-frequency signal generator $11$, coupled by leads $12$ to a radio transmitter $13$ coupled to an antenna $14$. The constant-frequency signal generated by generator $11$ is caused to modulate a radio-frequency carrier wave generated by transmitter $13$, and the modulated wave is radiated by the antenna $14$ into space. The other two stations $S2$, $S3$ are exactly the same, hence are not shown. The airplane or other object under observation carries a station comprising a radio receiver $15$ with an antenna $16$, leads $17$ coupling receiver $15$ with a radio transmitter $18$, and an antenna $19$ connected with transmitter $18$. Part of the modulated wave radiated by antenna $14$ is received by antenna $16$ and demodulated by receiver $15$, whose signal ouput is impressed upon transmitter $18$. This effects modulation of another radio frequency carrier wave which is radiated by antenna $19$, the frequency of this other wave preferably being different from that radiated by anetnna $14$. The modulated wave transmitted from the airplane station is received by antenna $20$ and transmitted to radio receiver $21$, where it is demodulated. The signal output from receiver $21$ is transmitted by leads $22$ to filter network 23 where all components of the modulation are removed except that corresponding to the constant-frequency signal generated by generator 11. Leads 24 connect the filter network to the responsive element of a phase angle meter 25, coupled by leads 28, 29 to the leads 12 which connect the signal generator 11 and transmitter 13. Because of this manner of connection, the phase meter measures the phase of the output signal from the filter network with respect to the output signal from the signal generator. The reading of the phase angle meter is then a function of the total phase change occurring throughout the transit of the original signal to the airplane A and back again. This phase change is composed of two separate parts, one of which is constant due to the fixed characteristics of the transmitter 13, receiver 14, transmitter 18, receiver 21 and filter network 23, and the other of which is variable in direct proportion to the total distance between the observation station and the airplane. If the phase angle meter is set to zero when the airplane is at or very near the observation station, subsequent readings on said meter when the airplane is in flight are indicative of the distance between the observation station and the airplane.

To express mathematically the relationship between the phase angle shown by meter 25 and the distance D1, D2, or D3 between stations S1, S2, or S3, respectively, and the airplane, the following symbols will be employed:

D = distance to be measured (may be D1, D2 or D3)
P = phase angle shown by the meter 25
$P_0$ = phase angle when the airplane is at the station and D=0
V = speed of radio-frequency carrier wave in space
F = modulation frequency
L = modulation wave length on the carrier wave in space Now the total phase difference between two points on a wave is proportional to the number of wave lengths by which those points are separated, and a separation of one wave length is equivalent to one complete phase cycle or $2\pi$ radians. In this particular case, the equivalent distance between the two points whose phases are to be compared is twice the actual distance between the two stations concerned, because the wave is required to traverse the path to and from the re-transmitting station.

Therefore, $$P = \frac{2D}{L}(2\pi) + P_0 \quad (1)$$

However, the initial adjustment of the phase angle meter can be made to set $P_0 = 0$, in which case $$P = \frac{4\pi D}{L}$$

or transposing, $$D = \frac{L}{4\pi} \cdot P \quad (2)$$

Equation 2 shows the direct proportionality between D and P for any constant value of L. However, since it is not convenient to measure L directly, Equation 2 may be rewritten in more useful form by employing the familiar equation $$V = FL, \text{ or } L = \frac{V}{F} \quad (3)$$

Inserting the value of L from Equation 3 in Equation 2 gives $$D = \frac{V}{4\pi F} \cdot P \quad (4)$$

The speed, V, is an accurately known constant, and the modulation frequency, F, may be measured directly by well known means. Thus the constant of proportionality between D and P may be evaluated, and the scale of the phase angle meter may be graduated directly in units of length.

Any one of the distances D1, D2 or D3 is measured by use of Equation 4. However, the signal frequencies employed for the three different measurements are necessarily unequal, to permit proper separation of the signals by the three different filter networks 23 at the three stations S1, S2, S3.

Alternatively, three different radio-frequency carrier waves could be employed at the three stations, with one signal frequency, but as this would necessitate three different receiver-transmitter-antenna hook-ups on the airplane, it would normally be considered an undesirable arrangement. The preferred apparatus at the airplane station comprises merely the parts shown in Fig. 3, which may be standard equipment on airplanes equipped to receive and send messages by radio.

Referring to Fig. 1 again, station S1 is arbitrarily placed at the origin of the X, Y, Z axes, with station S2 on the Y axis and station S3 on the X axis. This placement is not mandatory but is convenient for purposes of description. The X and Y axes are in the "plane" of the surface of the earth, while the Z axis is perpendicular to said plane. Directly beneath the airplane A is a point A1 which is in said plane, being separated from the airplane by a distance equal to vertical line z, from station S1 by a distance r, from station S2 by a distance m, and from station S3 by a distance n. Point A1 is also a certain distance x from the Y axis, and a distance y from the X axis, lines x and y being of course in the plane of the X—Y axes. From Fig. 1 the following equations are apparent:

$$(D1)^2 = z^2 + r^2 \quad (5)$$
$$(D2)^2 = z^2 + m^2 \quad (6)$$
$$(D3)^2 = z^2 + n^2 \quad (7)$$
$$r^2 = x^2 + y^2 \quad (8)$$

For convenience, the distance from station S1 to station S2 equals the distance from S1 to S3, and such distance is designated d, in the following presentation:

$$n^2 = y^2 + (d-x)^2 \quad (9)$$
$$m^2 = x^2 + (d-y)^2 \quad (10)$$

From the foregoing, it can be shown that $$x = \frac{1}{2d}[d^2 + (D1)^2 - (D3)^2] \quad (11)$$

$$y = \frac{1}{2d}[d^2 + (D1)^2 - (D2)^2] \quad (12)$$

$$z = \sqrt{(D1)^2 - x^2 - y^2} \quad (13)$$

Equations 11, 12 and 13 serve to define, in terms of simultaneous values of D1, D2 and D3, the position of airplane A with respect to the X, Y, Z axes. By determining D1, D2 and D3, hence x, y and z, separately as functions of time, it is possible to evaluate the derivatives, $$\frac{dx}{dt}, \frac{dy}{dt}, \frac{dz}{dt}$$

also the second derivatives.

From these time rates of change, it is possible to express the rate of climb $$\frac{dz}{dt}$$

the ground speed $$\frac{ds}{dt} = \sqrt{\left(\frac{dx}{dt}\right)^2 + \left(\frac{dy}{dt}\right)^2} \qquad (14)$$

the true speed in space $$\frac{dS}{dt} = \sqrt{\left(\frac{dx}{dt}\right)^2 + \left(\frac{dy}{dt}\right)^2 + \left(\frac{dz}{dt}\right)^2} \qquad (15)$$

and the resultant acceleration, $$\frac{d^2s}{dt^2} = \sqrt{\left(\frac{d^2x}{dt^2}\right)^2 + \left(\frac{d^2y}{dt^2}\right)^2 + \left(\frac{d^2z}{dt^2} + g\right)^2} \qquad (16)$$

The phase angle meters could be used as simple indicating devices from which readings could be taken visually at desired intervals of time, but preferably their indications will be recorded by means of a motion picture camera (not shown) or some other graphic device that records on a strip of paper or chart the time of recording as well as the actual reading. To facilitate recording, the phase meter preferably is of a type that yields a direct-current output proportional to the phase angle. The circuits of the preferred type of phase meter, also details of its construction, are omitted because no claim is made thereto.

The above description explains one method of practicing the invention. An improved system of measurement, now preferred by me because of its simplicity, utilizes only one modulation-frequency for measurement of the three distances D1, D2, D3. See Fig. 4. A radio wave modulated with a single and constant frequency is transmitted from station S1 and is received at the airplane station, where the modulation is detected and then re-transmitted on another radio wave having a different constant-frequency. This radio wave is received at stations S1, S2, and S3, and the modulation as received at stations S2 and S3 is relayed to the central or control station S1 by conducting lines or by re-transmission on two different radio carrier waves. Finally, the phase angle of each of the three returning modulation signals is measured at station S1 with respect to the outgoing modulation signal being transmitted from that station. This arrangement does away with the signal generator, radio transmitter, transmitter antenna and filter networks at stations S2 and S3, and the filter network at station S1.

Referring to Fig. 4, the control station S1 comprises a single radio transmitter 13 and antenna 14 for radiating a modulated-frequency wave, the modulation being on a constant-frequency wave generated by signal generator 11. The airplane station is the same as in Fig. 3, namely, a receiver 15 with antenna 16 coupled to a transmitter 18 with an antenna 19. Two of the observation stations, S2 and S3, are similar to the airplane station, since they each comprise merely receivers 15a and 15b, with antennas 16a, 16b respectively, transmitters 18a, 18b, and antennas 19a, 19b respectively. Receivers 15a, 15b are each tuned to receive signals from transmitter 18 and transmitters 18a, 18b are preferably each tuned to different frequencies, and to frequencies different from those of transmitters 13 and 18. But the control station S1 now has three antennas 20, 20a, and 20b, each coupled to a receiver 21, 21a, 21b respectively. There are also three phase meters 25, 25a, 25b individually coupled to the three receivers as shown. All three phase meters are connected to leads 12, as in the arrangement of Fig. 3.

To illustrate the manner in which the three phase angle measurements may be employed to determine the required straight line distances D1, D2, D3 to the airplane, the following symbols may be used:

P1 = phase angle at S1 of modulation received at S1

P2 = phase angle at S1 of modulation received at S2

P3 = phase angle at S1 of modulation received at S3.

Now the actual path traversed by the modulation received at S1 is the same as in the first described arrangement and is equal to 2D1. Rewriting Equation 4, we obtain:

$$P1 = \left(\frac{4\pi F}{V}\right) \cdot D1 \qquad (17)$$

provided the equipment is initially adjusted to counteract all constant phase shifts in the system due to the characteristics of the equipment involved. The total path traversed by the modulation received at S2 is equal to the sum of D1, D2 and d; hence $$P2 = \left(\frac{2\pi F}{V}\right) \cdot (D1 + D2 + d) \qquad (18)$$

But the distance d is fixed and produces a constant phase shift which may be counteracted when the initial adjustment is made to eliminate other constant phase shifts occurring in the various elements of the system. When this initial adjustment has been accomplished, the value of P2 is:

$$P2 = \left(\frac{2\pi F}{V}\right) \cdot (D1 + D2) \qquad (19)$$

Similarly, the modulation received at S3 must traverse a total path equal in length to the sum of D1, D3 and d. After the same initial adjustments have been made:

$$P3 = \left(\frac{2\pi F}{V}\right) \cdot (D1 + D3) \qquad (20)$$

Simultaneous solution of Equations 17, 19 and 20 yields the following values for the three required distances:

$$D1 = \left(\frac{V}{4\pi F}\right) \cdot P1 \qquad (21)$$

$$D2 = \left(\frac{V}{4\pi F}\right) \cdot (2P2 - P1) \qquad (22)$$

$$D3 = \left(\frac{V}{4\pi F}\right) \cdot (2P3 - P1) \qquad (23)$$

The initial phase adjustments mentioned above may be accomplished conveniently by placing the airplane on the ground at a point A2 (Fig. 1) spaced from stations S1, S2, S3 by the known distances a, b and c, respectively. Then with the complete flight path recording system in operation, the three phase meters at stations S1, S2, S3 will be adjusted to the proper initial indications which are defined by the following expressions:

$$S1 \text{ adjustment} = \frac{4\pi F}{V} \cdot a \qquad (24)$$

$$S2 \text{ adjustment} = \frac{4\pi F}{V} \cdot (a + b) \qquad (25)$$

$$S3 \text{ adjustment} = \frac{2\pi F}{V} \cdot (a + c) \qquad (26)$$

This initial adjustment could be facilitated in connection with permanently established stations S1, S2, S3 near an airport by placing a fixed marker anywhere on the field at an accurately known location. Immediately prior to the start of a flight which is to be recorded, the airplane could be taxied to the marker and the three initial phase meter adjustments could then be made at the recording station S1.

This preferred arrangement is advantageous over the one first described in that (1) only one modulation frequency is required; (2) transmission of a radio wave to the airplane is required from one station only; (3) no selective filtering of separate components of a complex modulation signal is required; (4) the total investment in apparatus (hence maintenance costs etc.) is less.

The preferred arrangement of Fig. 4 may be further simplified as illustrated in Fig. 5, wherein like parts are identified by like reference numerals. In Fig. 5, two of the receivers at the control station are eliminated, being unnecessary because a transmitter at each of the observation stations is not used. Instead, each observation station is directly connected by leads 41, 42 (which are land lines, e. g., telephone wires) with a corresponding phase angle meter at the control station. This arrangement, while employing less apparatus, in some cases will be considered disadvantageous in that land lines must be used to transmit electrical impulses to measure the phase angles of the modulated waves received at the two observation stations.

The basic method of this invention has been illustrated by a system of apparatus in which the time of transit of a radio-frequency wave is determined from a measurement of phase displacement of constant-frequency modulation on that wave. An alternative method, which allows the measurement of distance and location by the same geometrical pattern of transmission of radio waves, is one in which the radiated signals appear as short bursts or pulses of radio-frequency energy instead of as modulated continuous waves. Such a method is illustrated in Fig. 6 in which a radio transmitter 30 at the observation station is turned on for brief periods by a pulse generator 31 that produces very short electrical signals, preferably at regular intervals. The time interval between successive pulses may be long compared to the actual duration of an individual pulse. These electrical signals are radiated into space by antenna 32. A radio receiver 33 on the airplane, coupled to an antenna 34, responds to the radiated energy from the observation station and yields at its output terminals short pulses similar to those produced by the pulse generator. These pulses in the receiver output actuate a keying device 35 which controls a transmitter 36 on the airplane in such a manner as to produce pulses similar to those radiated from the observation station. These pulses are radiated by antenna 37. In the case with modulated continuous waves, the carrier-frequencies of the two radio transmitters 30 and 36 preferably are different; however, this pulse system may readily employ one single radio-frequency for both of the transmitters 30 and 36. A radio receiver 38 at the observation station having antenna 39 responds to the pulses radiated from the airplane station and thereby produces in its output circuit pulse signals that are similar to those originating at the pulse generator 31 but that occur at later times because of the delays in transmission between the two stations. The time interval between generation and final reception of individual pulses is determined by means of a timing device 40 that is connected between the output of the pulse generator 31 and the output of the radio receiver 38 at the observation station. This timing device may be electronic in character and it is preferably one having fast response and high inherent stability. Since a phase angle meter is also a time-measuring device, I have used this term in some of the claims to designate either timing device 40 or a phase angle meter.

As in the system using modulation on a continuous radio wave, time delays of fixed amount will occur in the various devices required for transmission, reception, re-transmission, and return reception of the pulse signals. However, such constant delays may be accounted for by methods similar to those hereinbefore described, and the variable time delays may thus be recognized and employed to define the changing distances to be measured.

While the method of the invention is especially useful in determining the path of an airplane in flight, it could be used to establish the location of any land or water-borne object that is equipped to receive and re-transmit the necessary signals. Obviously, the reverse of the described arrangement might be employed, i. e., the signal generating and phase angle measuring apparatus might be on the movable object to permit the navigator of that object to determine the position thereof with respect to re-transmitting stations at known locations.

In the arrangements so far described, one or more of the observation stations is a control station, with transmitting, receiving, and measuring apparatus at the control station. Fig. 2 shows a different arrangement, wherein the control station is neither on the X or Y axes nor at the origin, but is at any point C in the plane of the X—Y axes. The airplane A is anywhere above the surface of the earth and has a station like the one shown in Fig. 3, or like that of Fig. 6 if preferred. The transmitting equipment is not located at observation stations S1, S2, S3, or the control station C, but is at a relatively remote point T. Modulated-frequency waves or pulses are radiated at point T, and are received at the airplane station, also at the control station. Those received at the airplane station are re-transmitted to the three stations S1, S2, and S3, and by means of electrical circuits (as in Fig. 5) or radio transmitters (as in Fig. 4), are relayed to the control station. With this arrangement, the "observation" stations are nothing more than receiving and relaying points and work entirely automatically. The control station will have at least four radio receivers, or the equivalent, to permit measurements of the time lags between the waves or pulses received direct from the transmitting station T and those re-transmitted from the airplane to the relay stations, thence to the control station.

In Fig. 7 I show another arrangement of apparatus which is similar to Fig. 3 except that the two R. F. receivers do not include means for demodulating the incoming radio-frequency waves. Instead, each receiver delivers at its output side a signal which is merely an amplified reproduction of the particular radio-frequency antenna signal to which the receiver is tuned.

In further explanation of the system of Fig. 7, let us assume that the signal delivered by signal generator 50 at the control station is applied to R. F. transmitter 51 so as to produce modulations of the R. F. carrier wave radiated from the antenna 52. This modulated carrier wave is received by antenna 53 at the airplane station, and after passing through R. F. receiver 54 is amplified and then changed in frequency by a constant factor by frequency changer 55. Thus no demodulation takes place at the airplane station. The new carrier wave thus created, retaining the original modulation, is then passed through R. F. transmitter 56 and is radiated by antenna 57, received by antenna 58 at the control station, and after amplification by R. F. receiver 59, is demodulated by demodulator 60. The modulation signal thus obtained is then compared with the corresponding signal at the output side of signal generator 50, by means of phase meter 61, which therefore gives a measurement of time or phase difference and may be calibrated in units of length to give readings of the distance of the airplane from the control station.

The system of Fig. 7 is applicable to the complete three-dimensional path-determining methods described above in connection with Figs. 4 and 5. With the arrangement of Fig. 4, each observation station would be like the airplane station of Fig. 7 and the carrier frequency would thus undergo one change at the airplane station and another change at each of the observation stations. With the arrangement of Fig. 5, wherein land lines are used and the R. F. transmitters at the observation stations are omitted, the carrier frequency will undergo one change at the airplane station but will not undergo a second change at each of the observation stations. The signals generated by signal generator 50 may be a series of pulses, as in the arrangement of Fig. 6, in which case the phase meter 61 will be a timer equivalent to timer 40. The method of Fig. 7 has a practical advantage in that the absence of demodulation, except at the receiving side of the control station, minimizes the chances of error due to phase changes of the modulation signal in response to temperature effects or other phenomena unrelated to the distance being measured.

Assuming that the apparatus is properly installed and has sufficient power, the method of the invention accomplishes the direct measurement of the distance between two isolated points equipped with the apparatus. No instruments of the light-ray type are used, hence the method works as well, or better, in total darkness than in daylight. The object is located in space without resort to direction measurement. The radio apparatus requires no directional transmitting or receiving equipment. When an airplane is the object, very little special equipment is required on the airplane because suitable radio apparatus generally is installed thereon for other purposes. The method makes it possible to trace the true flight path in space and permits the direct determination of true speed, ground speed, altitude, rate of climb, acceleration, and other kinematic functions, without reference to any characteristics of the airplane or of the atmosphere. Another feature is that the inventive method is inherently free from lag. Still another advantage is that complete flight records may be preserved of an airplane, for example of an experimental type, which is deliberately or accidentally destroyed in a crash. The method will reveal discontinuities in a flight path, hence will identify the point of occurrence of, and the kinematic conditions attending, any disintegration of an airplane in flight. These statements indicate that the invention may be very useful in experimental work with airplane models as well as with full-sized airplanes, for instance in divetesting. Still another advantage is that speeds may be measured at speeds above those at which conventional pressure instruments are reliable, up to and above the speed of sound.

The present invention accomplishes the determination not only of the horizontal position of a moving object but also of the vertical distance from that object to the reference plane. Thus this invention permits the location of an object in terms of three-dimensional co-ordinates in space.

A further important advantage of this method of position and path recording is that it is responsive only to objects equipped with suitable apparatus that is in operation and adjusted to cooperate with similar equipment located at the several observation stations. Unlike methods dependent upon reflection of radiant energy, the present method of position measurement is unaffected by the presence of other objects similar to the one under observation, even when those other objects are near to the one being observed.

Obviously the method is not limited to use of the apparatus that is shown herein for the purpose of illustration.

What I claim is:

1. Means for continuously obtaining information sufficient to determine the instantaneous position of an airplane with respect to three ground points located at the vertices of a triangle, said means comprising a control station located at the first of said ground points, said control station comprising a local oscillator and means for radiating a first carrier wave modulated by the frequency of said local oscillator, means in said airplane for receiving and demodulating said first carrier wave and for modulating a second carrier wave with the signal resulting from demodulation of said first carrier wave, means in said airplane for radiating said modulated second carrier wave, means at said control station for receiving and demodulating said second carrier wave and for comparing the phase of the resulting signal with that of the local oscillator signal, means at the second of said ground points for receiving and demodulating said second carrier wave and for modulating a third carrier wave with the signal resulting from demodulation of said second carrier wave, means at said second ground point for radiating said modulated third carrier wave, means at the third ground point for receiving and demodulating said second carrier wave and for modulating a fourth carrier wave with the signal resulting from demodulation of said second carrier wave, means at said third ground point for radiating said modulated fourth carrier wave, means at said control station for receiving and demodulating said third carrier wave and for comparing the phase of the resulting signal with that of the local oscillator signal, and means at said control station for receiving and demodulating said fourth carrier wave and for comparing the phase of the resulting signal with that of the local oscillator signal.

2. Means for continuously obtaining information sufficient to determine the instantaneous position of an airplane with respect to three ground points located at the vertices of a triangle, said means comprising a control station located at the first of said ground points, said control station comprising a local oscillator and means for radiating a first carrier wave modulated by the frequency of said local oscillator, means in said airplane for receiving said modulated first carrier wave and for changing the frequency thereof without altering the modulation frequency to produce a second carrier wave having the same modulation as said first carrier wave, means in said airplane for radiating said second modulated carrier wave, means at the second of said ground points for receiving said second modulated carrier wave and for changing the frequency thereof without altering the modulation frequency to produce a third carrier wave having the same modulation as said second modulated carrier wave, means at said second ground point for radiating said third modulated carrier wave, means at the third of said ground points for receiving said second modulated carrier wave and for changing the frequency thereof without altering the modulation frequency to produce a fourth carrier wave having the same modulation as said second carrier wave, means at said third ground point for radiating said fourth modulated carrier wave, means at said control station for receiving and demodulating said second carrier wave and for comparing the phase of the resulting signal with that of the local oscillator signal, means at said control station for receiving and demodulating said third carrier wave and for comparing the phase of the resulting signal with that of said local oscillator signal, and means at said control station for receiving and demodulating said fourth carrier wave and for comparing the phase of the resulting signal with that of said local oscillator signal.

PAUL W. NOSKER.

REFERENCES CITED

The following references are of record in the file of this patent:

UNITED STATES PATENTS

| Number | Name | Date |
| --- | --- | --- |
| 1,750,668 | Green | Mar. 18, 1930 |
| 1,945,952 | Nicolson | Feb. 6, 1934 |
| 2,134,716 | Gunn | Nov. 1, 1938 |
| 2,198,113 | Holmes | Apr. 23, 1940 |
| 2,207,267 | Plaistowe | July 9, 1940 |
| 2,248,727 | Strobel | July 8, 1941 |
| 2,406,953 | Lewis | Sept. 3, 1946 |
| 2,408,048 | Deloraine et al. | Sept. 24, 1946 |

FOREIGN PATENTS

| Number | Country | Date |
| --- | --- | --- |
| 116,666 | Australia | Oct. 10, 1941 |
| 116,667 | Australia | Oct. 10, 1941 |